July 14, 1942.  C. R. WASEIGE  2,289,396
MOUNTING OF ACCESSORIES ON AN AIRCRAFT
Filed Feb. 26, 1940  3 Sheets-Sheet 2

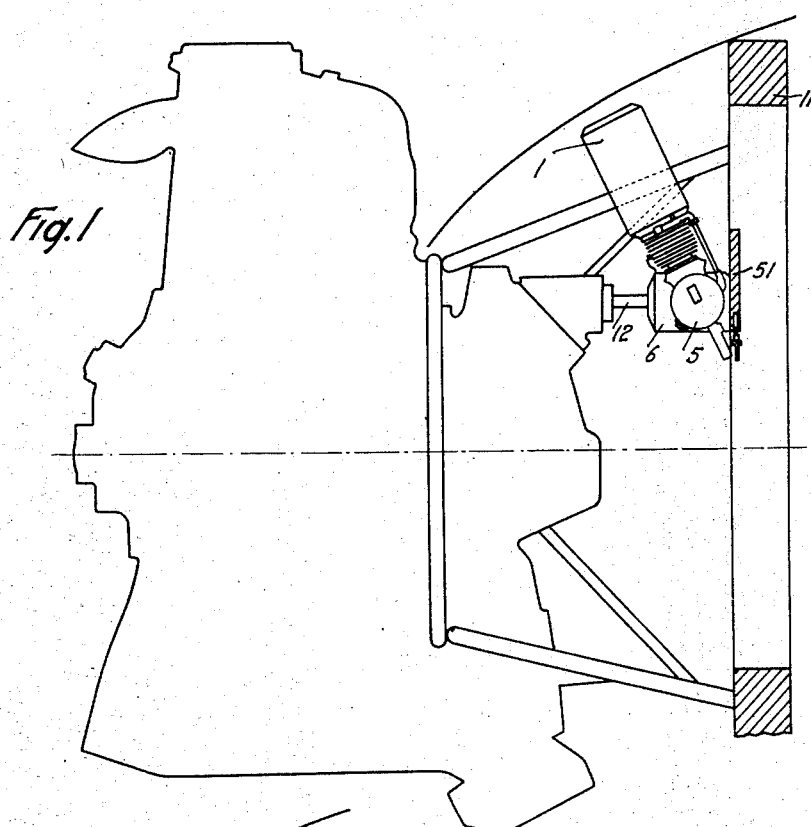
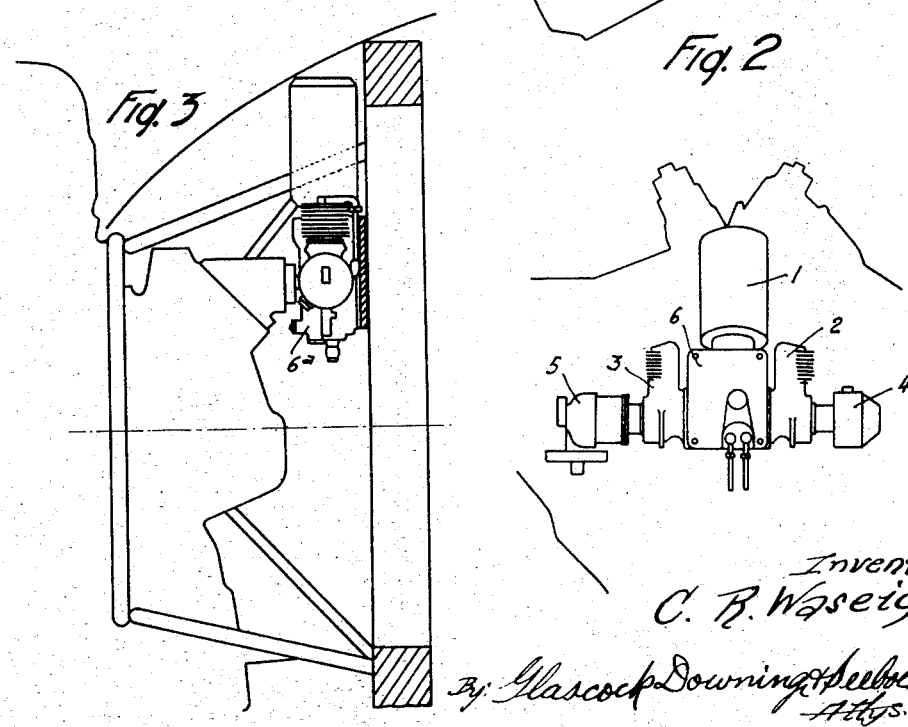

Inventor,
C. R. Waseige
By Glascock Downing &c
Attys.

July 14, 1942.　　　C. R. WASEIGE　　　2,289,396
MOUNTING OF ACCESSORIES ON AN AIRCRAFT
Filed Feb. 26, 1940　　　3 Sheets-Sheet 3
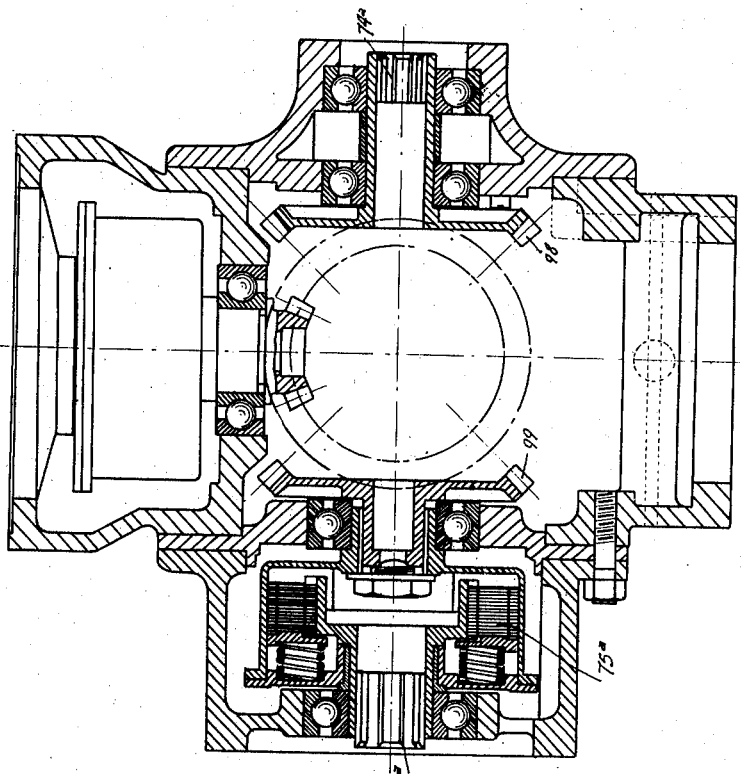
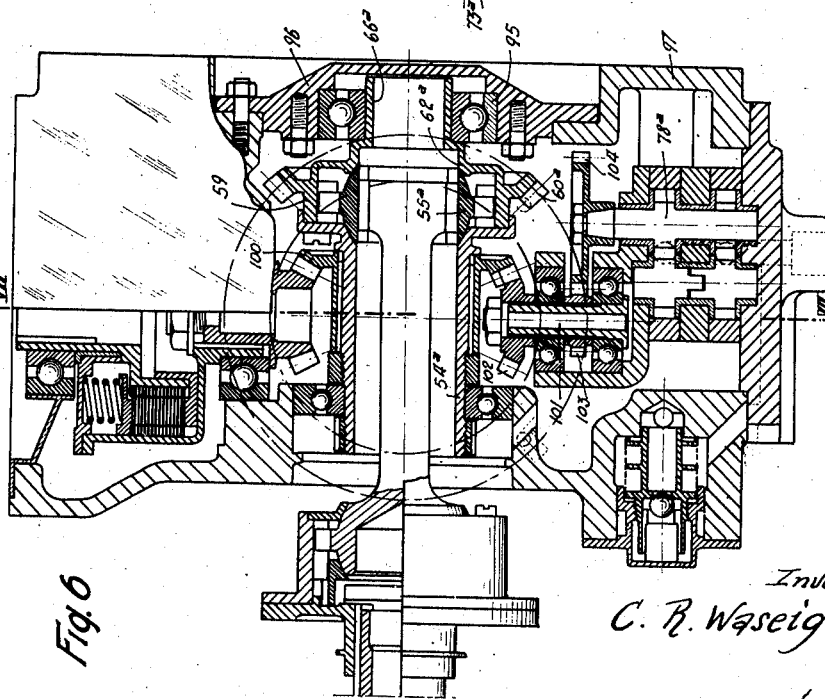
Inventor;
C. R. Waseige
By Glascock Downing & Seebold
Attys.

Patented July 14, 1942

2,289,396

UNITED STATES PATENT OFFICE 2,289,396

MOUNTING OF ACCESSORIES ON AIRCRAFT

Charles Raymond Waseige, Rueil-Malmaison, France, assignor to Air-Equipment, Bois-Colombes, Seine, France, a French company Application February 26, 1940, Serial No. 320,909
In France April 6, 1939

14 Claims. (Cl. 74—389)

In my co-pending application, Serial No. 207,115, a particular arrangement has been described of the accessories particularly on an aircraft, said arrangement comprising a multi drive gear box fixed on the structure of the aeroplane independently of the engine, connected to a power take-off from the latter by a cardan shaft and provided with a plurality of output components adapted to be coupled to the accessories which are to drive and which are fixed on the said box, so as thus to obtain a continuous armour from which there issues no other movable shaft than the main driving shaft.

My invention has for its object various modifications of the aforesaid arrangement.

According to one of said modifications, the gear box, instead of being a flat box, is of such a shape, for example prismatic, that the accessories can be arranged thereon and form around same a ring or star, the axes of the various power take-offs for driving the accessories being preferably concurrent at the same central point of the box and being contained or not in the same plane which is transversely to the main driving shaft.

Another object of my invention is to reduce the bulk and to enable said gear box to be placed nearer the engine.

Another modification is that there exists a plurality of power take-offs which project through the lateral faces of the box and which are driven by bevel gears provided with a common central pinion.

In a particular embodiment there exists in the box a transverse shaft which is perpendicular to the main shaft and is preferably in the same plane as the latter, the ends of said transverse shaft projecting through two opposite faces of the box where they act as a power take-off for the accessories, and said transverse shaft is driven by the main shaft through a torque limiting device and a single bevel gear, the driving pinion of which also drives a third power take-off. A single torque limiting device is thus used for two power take-offs.

In another particular embodiment, the cardan joint of the main shaft is located near the face of the box opposite that through which said shaft penetrates into the box and the lateral power take-offs are formed by separate shafts, in the extension of each other, arranged on either side of said main shaft and in the same plane as the latter, said shafts each carrying a bevel pinion meshing with a common driving pinion of the main shaft.

Furthermore, instead of all the accessories being directly fixed on the box, it may be advantageous for some of those that are directly fixed thereto to be arranged so as each to support another accessory and in particular for each to be provided with two shaft ends, the second shaft end being used to drive this other accessory.

By way of non-limitative examples, various embodiments of arrangements according to the invention have been shown in the accompanying drawings.

In said drawings:

Fig. 1 is a general diagrammatical view of the arrangement of accessories on an aeroplane in a manner according to the invention, the whole arrangement being shown as seen from the side, Fig. 2 is a corresponding front view;

Fig. 3 is a similar view to Fig. 1 of a modified embodiment;

Fig. 6 is similar to Fig. 4 and shows the power take-off box of the modified embodiment of Fig. 3;

Fig. 7 is a section along the line VII—VII of the box shown in Fig. 6.

Figure 4:
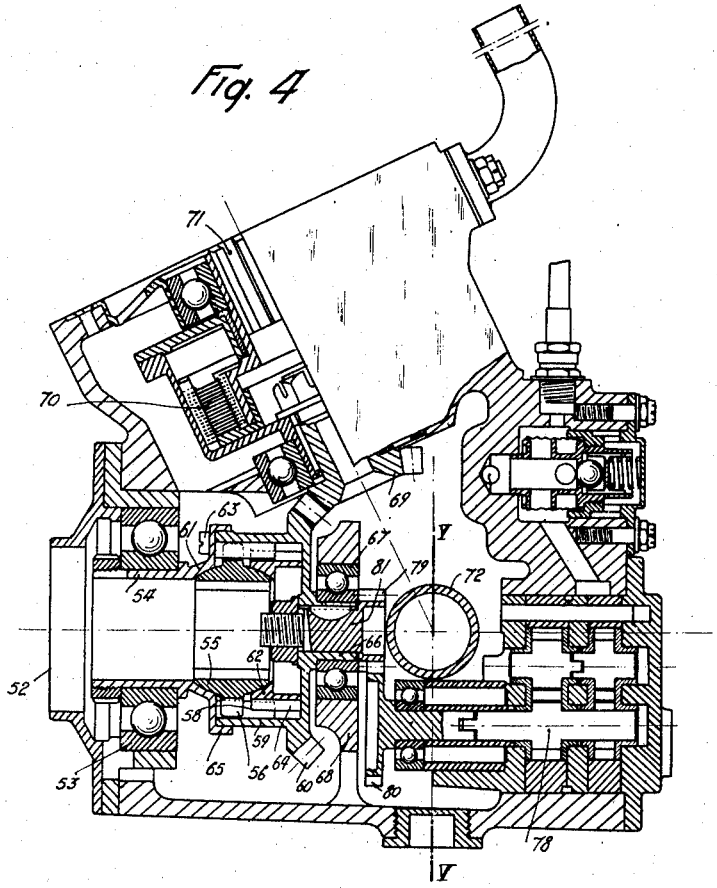
Fig. 4 is a longitudinal section through the axis of the driving shaft and on a larger scale, of the power take-off box.

In the exemplary embodiment of Figs. 1 to 4, the gear box 6 is of prismatic shape. Its rear face serves for fixing it on a cross-member 51 of the fire-shield partition 11; its front face is the one through which the cardan shaft 12 that comes from the engine penetrates inside the box 6; the upper face supports a generator 1, whereof the axis which is contained in a vertical plane is forwardly inclined and each lateral face supports two accessories placed end to end; in this case, the right face supports a high pressure air compressor 2 and a vacuum pump 4 which acts at the same time as a low pressure compressor and which is fixed endwise of the compressor 2 which is provided with two shaft ends, whereas the left face supports a medium pressure air compressor 3 and a hydraulic pump 5 which is likewise fixed endwise of said compressor 3 and is driven by the second shaft end of same.

The front face of said box 6 is provided in its medial region with an opening 52 in which is lodged a ball bearing 53 which supports a short hollow shaft 54 which is located inside the box and which carries at the end thereof a ball and socket joint, the ball 55 of which has an axial hole extending therethrough which is longitudinally splined to receive the likewise splined end of the driving shaft 12. Said ball 55 carries on the outside thereof an equatorial ring of teeth or short splines 56, the head of which terminates on a spherical or substantially spherical surface and the flanks of which are bulged in the medial transverse plane of said ring. Said teeth 56 are engaged in splines 58 cut on the inside of a socket or bush 59 rigid with a bevel pinion 60.

The ball 55 is pressed between two cups of spherical cross-section, one of which, 61, is formed at the end of the shaft 54 whereas the other, 62, is a separately fitted part connected to the first by screws 63. This separately fitted cup 62 carries on the outside thereof a ring of splines 64 engaged in the splines 58. The bush 59 is furthermore centered at the end of the shaft 54 by fitting its end into a housing 65 of the same shape carried by said shaft. On the opposite side to the bush 59, the pinion 60 carries a hollow boss 66 fitted into a ball bearing 67 lodged in an inner transverse partition 68 which projects from the bottom of the box. The pinion 60 meshes with another pinion 69 which drives, through a torque limiting device 70, the splined shaft 71 acting as a driving component or power take-off for the generator, as described in my co-pending application Serial No. 207,115.

In the same horizontal plane as the shaft 54 and on either side of same, extends a transverse hollow shaft 72 which passes right through the box and projects through the lateral faces of same by means of splined ends 73 and 74 which form two power take-offs for the two compressors 2 and 3. Said shaft 72 carries a single torque limiting device 75 on which is fixed a bevel pinion 76 which meshes with the pinion 60. The torque limiting device 75 thus serves at the same time for driving the two compressors 2 and 3.

The box is furthermore provided with a lubricating pump 78 arranged as described in my co-pending application Serial No. 207,115 and driven by a gear 79—80, the driving pinion 79 of which carries a tail 81 which is keyed in the hollow boss 66 of the pinion 60.

It will be observed that in the arrangement described above, the driving shaft 12 penetrates over a certain length thereof inside the box, thereby enabling it to be placed nearer to the engine while retaining the same length of driving shaft; furthermore, the connection between the box and the driving shaft can be made and broken instantly since the shaft penetrates freely into the ball 55 to which it is only connected by splines; on the other hand, all the power take-offs or output components are completely enclosed inside the box.

In the modified embodiment of Fig. 3, the gear box 6a is formed on the outside substantially like the box 6 of the embodiment shown in Figs. 1 and 2, save that the axis of the generator 1 is vertical and the box is slightly flatter and higher.

On the inside (Figs. 6 and 7), the hollow shaft 54a is much longer than that of Figs. 3 and 4 and extends beyond the centre of the box so that its driving ball 55a is located quite near the rear face of the box. The socket 59 which is driven by said ball is rigid with the bevel pinion 60a. The pinion 60a has its tail 66a supported in a ball bearing 95 located in a cover 96 fixed on this rear wall 97 and closing a central hole in the latter. The ball 55a is formed like the one described with reference to Fig. 4, save that the spherical seat 62a of the male part is directly cut in the bottom of the bush 59.

The power take-offs 73a and 74a on the lateral faces of the box are in this case formed by two separate shafts placed in the extension of each other on either side of the shaft 54a and the common driving pinion 60a for these two take-offs is connected to them by means of two separate pinions 98 and 99, the pinion 98 being directly fixed on the shaft 74a whereas the pinion 99 is connected to the shaft 73a through a torque limiting device 75a. On the other hand, the driving pinion of the generator is driven by a pinion 100 keyed on the part of the shaft 54a located at the centre of the box.

Furthermore the lubricating pump 78a which is of the same type as in my co-pending application Serial No. 207,115, is arranged in such a manner that the axes of rotation of its gears are vertical and it is driven by the pinion 100 through a vertical counter-shaft 101 located in the extension of the axis of the generator below the shaft 54a, said counter-shaft 101 carrying a bevel pinion 102 meshing with the pinion 100 and a spur gear 103 meshing with a gear 104 fast on the shaft of the pump.

Figure 5:
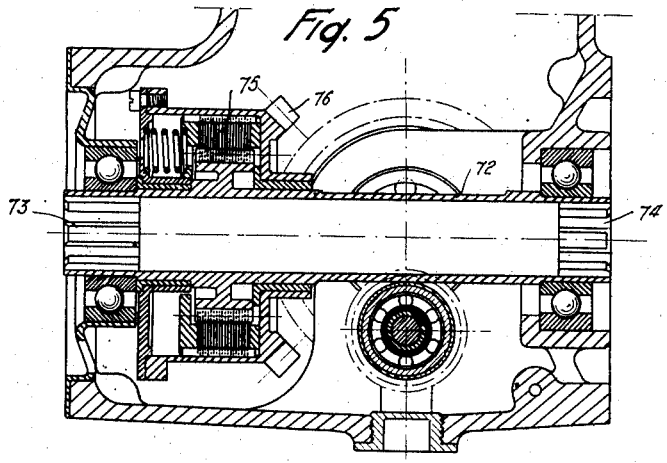
Fig. 5 is a transverse section of this same box along the line designated by V—V in Fig. 4.

Of course, the invention is in no way limited to the constructional details illustrated and described, which have only been given by way of example; thus, in particular, the axis of the generator may be vertical or inclined, whatever be the embodiment shown and also the pump with a vertical axis may be applied to the embodiment of Figs. 4 and 5 or to any other.

While I have illustrated and described the preferred form of construction for carrying my invention into effect, this is capable of variation and modification, without departing from the spirit of the invention. I therefore do not wish to be limited to the precise details of construction set forth but desire to avail myself of such variations and modifications as come within the scope of the appended claims.

I claim:

1. A gear box for the driving for accessories, designed to be fixed thereto including a case, a main driving element, a bevel pinion arranged within said case coaxially with said element and in driving connection with said element, a transversal shaft which extends between two openings provided in two opposite lateral faces of the case and forms output components for the driving of accessory devices designed to be secured to said faces, a bevel gear coaxially arranged with reference to said transversal shaft and in mesh with said bevel pinion, means drivingly connecting said bevel gear and said transversal shaft, a torque limiting device included in said means, a further bevel gear in mesh with said bevel pinion, an accessory driving shaft coaxial with said further bevel gear and adapted to be coupled to an accessory secured to a third face of said case through an opening provided in said third face, a driving connection between said driving shaft and said further bevel gear, and means for fixing accessories on said three faces.

2. A gear box as claimed in claim 1 including a torque limiting device in said last named driving connection.

3. A gear box as claimed in claim 1 including further a lubricating pump arranged within said case for the lubrication of both said box and at least a part of the accessories designed to be mounted on said latter, a gearing in mesh with said bevel pinion and a driving connection between said gearing and said pump.

4. A multi drive gear box for a plurality of accessories designed to be fixed thereto comprising a case having a number of faces adapted to carry accessories to be driven, each of said faces having at least one opening therein, a plurality of out-put components mounted within said case and adapted to be coupled through said openings with the accessories to be driven, a ball and socket joint located inside said case, means for rotatably mounting said socket, gearing means for actuating said out-put components from said socket, said ball being arranged for rotatable connection with a driving shaft projecting outside the box.

5. A multi-drive gear box for a plurality of accessories designed to be fixed thereto, comprising a case having a number of faces adapted to carry accessories to be driven, each of said faces having at least one opening therein, a plurality of output components mounted within said box and adapted to be coupled through said openings with the accessories to be driven, a ball and socket joint located within said case, means mounting said socket for rotation motion, gearing means for actuating said output components from said socket, said ball being formed with an inner axial hole provided with longitudinal splines, and the face of said case opposite said ball being provided with an opening in register with said ball.

6. A multi-drive gear box for a plurality of accessories designed to be fixed thereto, comprising a case, at least three faces of which are adapted to carry accessories to be driven, two of said faces being opposite each other, a transversal shaft extending between two openings provided in said opposite faces respectively, said transversal shaft being adapted to be coupled through said openings with accessories carried by the corresponding faces, a driving element within said case, a driving connection between said element and said transversal shaft, a torque limiting device included in said driving connection, an output component carried by said case and adapted to be coupled to an accessory secured to the third face through an opening provided in the same face and a driving connection between said output component and said driving element.

7. A multi-drive gear box as claimed in claim 6, in which said shaft is hollow and provided with inner coupling splines at both ends.

8. A multi-drive gear box for a plurality of accessories to be fixed thereto, comprising a case having a number of faces adapted to carry accessories to be driven, each of said faces having at least one opening therein, a plurality of output components mounted within said box and adapted to be coupled through said openings with the accessories to be driven, a ball and socket joint located within said case, means mounting said socket for rotation motion, at least one gear rigid with said socket, and gearing means for actuating said output components from said socket, said gearing means including at least one further gear in mesh with said first named gear.

9. A multi-drive gear box as claimed in claim 8, in which said gears are bevel gears, and their axes are substantially at right angle.

10. A multi-drive gear box as claimed in claim 8, in which said first named gear is a bevel gear, and all said gearing means are in mesh with said bevel gear.

11. A multi-drive gear box for a plurality of accessories designed to be fixed thereto including a case having a number of faces, a main driving shaft penetrating within said case through an opening provided in one of said faces, a ball and socket joint actuated by said shaft and located within said case near the face of the latter opposite said first named face through which said shaft penetrates within said case, means mounting said socket for rotation motion, at least two accessory devices driving shafts arranged in said case between said joint and said first named face, a driving connection between said socket and each of said accessory device driving shafts, said last named shafts being adapted to be coupled with accessories through openings provided in the faces of said case.

12. A multi-drive gear box for a plurality of accessories designed to be fixed thereto, including a case having a number of faces, a main driving shaft penetrating within said case through an opening provided in one of said faces, a ball and socket joint actuated by said shaft and located within said case, near the face of the latter opposite said first named face through which said shaft penetrates within the case, means mounting said socket for rotation motion, a bevel gear coaxial with said socket and in driving connection therewith, accessory driving shafts arranged in said case between said bevel gear and said first named face, a bevel driving pinion carried by each of said accessory driving shafts and in mesh with said bevel gear, said last named shafts being adapted to be coupled with accessories through openings provided in the faces of said case.

13. A gear box as claimed in claim 12 including within said case a further bevel gear drivingly connected with said socket and substantially coaxial with said latter, a further accessory driving shaft adapted to be coupled with an accessory through an opening provided in a face of the case, a bevel pinion carried by said last named shaft and in mesh with said further bevel gear, a lubricating pump, a bevel pinion in driving connection with said pump and in mesh with said further bevel gear.

14. A multi drive gear box for a plurality of accessories designed to be fixed thereto including a case having a number of faces, a main driving shaft penetrating within said case through an opening provided in one of said faces, a ball and socket joint actuated by said shaft and located within said case near the face of the latter opposite said first named face through which said shaft penetrates within the case, means mounting said socket for rotation about a substantially horizontal axis, two bevel gears coaxial with the socket and in rotating connection therewith, three accessory driving shafts arranged in said case between said socket and said first named face and adapted to be coupled with accessories through openings provided in faces of said case, two of said last named shafts being substantially in the extension of each other on either side of said main driving shaft, a bevel driving pinion carried by each of said two shafts and in mesh with one of said bevel gears, a bevel pinion carried by the third accessory driving shaft and in mesh with the other bevel gear, a lubricating pump within said case and a driving pinion drivingly connected with said pump and in mesh with said other bevel gear.

CHARLES RAYMOND WASEIGE.